Nov. 21, 1967  NORIYUKI NAGAOKA  3,353,690
BOARD MATERIAL SHIFTING MECHANISM FOR A
MULTIPLATEN HOT PRESS
Filed Nov. 4, 1964
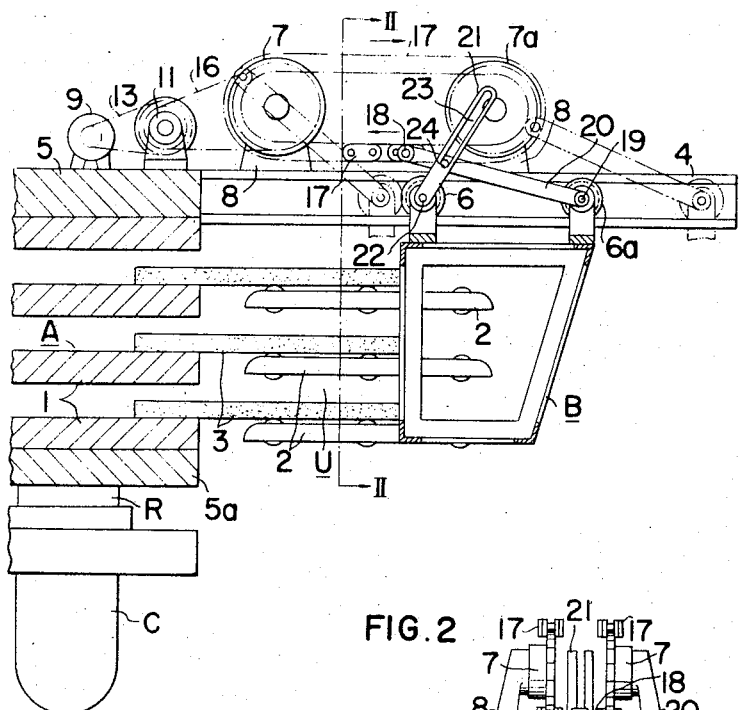
FIG. 1
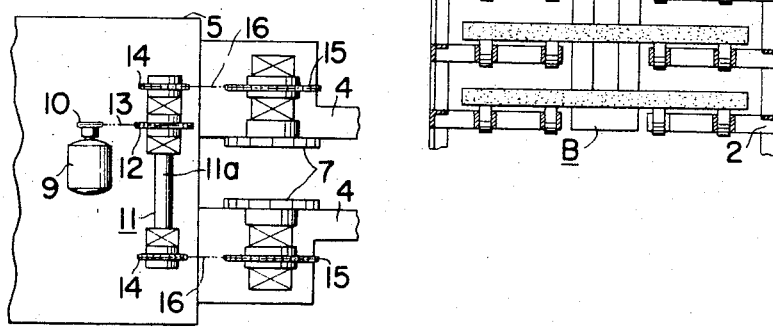
FIG. 2
FIG. 3

United States Patent Office 3,353,690
Patented Nov. 21, 1967

3,353,690
BOARD MATERIAL SHIFTING MECHANISM FOR A MULTIPLATEN HOT PRESS
Noriyuki Nagaoka, Nagoya-shi, Japan, assignor to Kabushiki Kaisha Taihei Seisakusho, Nagoya-shi, Japan, a joint-stock company of Japan
Filed Nov. 4, 1964, Ser. No. 408,942
1 Claim. (Cl. 214—16.6)

This invention relates to multi-platen hot presses and the like and apparatus for inserting and ejecting large sheet material therefrom. More specifically, the invention relates to a new mechanism for shifting large sheet material (hereinafter referred to as work or workpiece) in such apparatus, with said mechanism being capable of operating at high speed yet with great accuracy.

Together with the recent trend toward the speed up of the pressing operation of multi-platen hot presses, there is a great need in the industry for means to augment the insertion and ejection of the board work being processed, particularly for means to speed up the operation of structures for shifting the workpiece.

Heretofore, rack and pinion devices, screw devices, and others have been used as transposing mechanisms of this type, but in the case of these devices high impact forces occur at the beginning and end of the travel of the structures for shifting the workpieces. Furthermore, because it is difficult to set the position of a shifting structure when it stops at the terminal point of its travel, the position of the work relative to the hot press is inaccurate, and various problems are caused. In order to speed up the operation and yet avoid the above stated adverse effects, it has been proposed to obtain a high mean speed by lowering the speed of the structure at the start and end of its travel and increasing its speed in the intermediate region of its travel. This method, however, requires complicated apparatus, and problems have arisen in attempted practical application thereof.

It is a general object of the present invention to provide, by solving the various problems mentioned above, a mechanism for the simultaneous shifting of board material capable of operating siliently at remarkably high speed and, moreover, capable of accurately maintaining particularly the position of the terminal point of its travel.

Briefly stated, the present invention resides in a board material shifting mechanism in the board material insertion and ejection apparatus of a multi-platen hot press, said mechanism comprising two endless sprocket chains in parallel disposition trained about respective pairs of sprocket wheels driven by a suitable driving system, a pusher structure adapted to travel along horizontal beams serving as a guide track, a pusher structure movable along said guide means in a direction to shift said board material sheets relative to said press, a link member connecting said sprocket chain to said pusher structure for imparting reciprocating movement to said pusher structure when said chain is driven, and arm pivotally connected to said pusher structure, said arm having an elongated slot therein, and a pin on said link positioned in said slot for sliding movement, whereby said arm during reciprocating movement of said pusher structure co-acts with said link member and pusher structure to maintain said chain in a substantially straight line between tangent points of said sprocket.

The nature, principle, and details of the invention will be more clearly apparent by reference to the following description with respect to a preferred embodiment of the invention, when taken in conjunction with the accompanying drawings throughout which like parts are designated by like reference characters, and in which:

FIGURE 1 is a side elevational view, partly in section, showing the embodiment of the invention;
FIGURE 2 is a sectional view taken along line II—II in FIGURE 1 the view looking in the direction of the arrows; and
FIGURE 3 is a top plan view of the driving system for the sprocket and chain unit of the mechanism shown in FIGURES 1 and 2.

Referring to the drawings, the apparatus in which the mechanism of the invention is incorporated includes a hot press A having upper and lower heads 5, 5a and heating platens 1 of suitable number and a loader U having spaced receiving shelves 2 at positions confronting and corresponding to the respective platens, whereby board material workpieces 3 supplied onto the shelves 2 can be moved freely onto respective platens 1. The workpieces 3 loaded on the heating platens 1 can be pressed according to any conventional method, for example, by raising the lower head 5a by means of a ram R which is driven upward by a pressure gas supplied into a cylinder C in which said ram is slidably supported. Each of the shelves 2 consists of half shelves extending from left and right sides (as viewed in FIGURE 2) with a space therebetween through which a pusher structure B to be described hereinafter can freely move during its operation of shifting the workpiece 3.

On one side of the upper head 5 of the hot press A, there are rigidly fixed two channel-shaped beams 4, 4 horizontally disposed in the direction of insertion or ejection of the workpiece 3 in mutually parallel relationship with their flanges directed toward each other. Each of these beams 4 serves as a support and guide track for rollers 6 and 6a provided at the upper part on one side of the pusher structure B, which is thereby suspended on said rollers, which are loosely engaged in the interior track of the channel beam 4 so as to be rollable therealong. The beams 4, 4 serve also to support two pairs of main sprocket wheels 7, 7a which are rotatably supported at suitable positions on bearings held by bearing supports 8.

The main sprocket wheels 7, 7 are driven synchronously by power from a motor 9 transmitted through a speed-change and transmission system 11, both mounted on the hot press upper head 5. The speed-change and transmission system 11 in this example comprises a sprocket wheel 10 fixed to the shaft of the motor 9, a sprocket wheel 12 fixed to a shaft 11a, a chain 13 trained about the sprocket wheels 10 and 12, sprocket wheels 14, 14 fixed to the shaft 11a, sprocket wheels 15, 15 fixed to the shafts of the main sprocket wheels 7, 7 respectively, in planes coinciding with the planes of the sprocket wheels 14, 14 respectively, and chains coupling the sprocket wheels 14, 14 to their respective sprocket wheels 15, 15. Thus, the main sprocket wheels 7, 7 are rotated synchronously in the same direction by the motor 9 as clearly indicated in FIGURE 3.

A sprocket chain 17 is trained around each pair of main sprocket wheels 7 and 7a.

One chain link of each chain 17 is coupled to the corresponding chain link of the other chain 17 by a transverse connecting pin 18, which is linked to shaft 19 of the roller 6a on each side of the pusher structure B by a link member 20. Accordingly, rotation of the main sprocket wheels 7 and 7a, through the accompanying movement of the chains 17, 17, causes the pusher structure B to move to the left and right as viewed in FIGURE 1.

The motion of each link member 20 confined by a confining arm 21 which is jointed at its base end with a pin on shaft 22 of the roller 6 on each side of the pusher structure B so as to be free to undergo luffing motion. This confining arm 21 is provided with a long slot 23 within which there is slidably and loosely engaged a pin 24 projecting transversely out of a predetermined point on the link member 20. This confining arm 21 serves to prevent, during the reciprocating motion of the pusher structure B, the connecting pin 18 from being lifted up by axial force due to the extremely large angle assumed by the link member 20 and from undergoing unstable movement. It has been found that, because of the effect of the confining arm 21, the pusher structure B is caused to undergo reciprocating motion in a very stable and silent manner.

By the above described arrangement and construction of the mechanism according to the invention, the pusher structure B is caused to undergo reciprocating movement between left and right dead points by driving power supplied by the motor 9 and transmitted through the speed-change and transmission system, the main sprocket wheels 7, 7a, the chains 17, and the link member 20, and accordingly the speed of this movement can be greatly reduced in the neighborhood of the two dead points. Therefore, the impact occurring when the pusher structure B contacts the workpieces 3 can be remarkably reduced. Moreover, since the speed of the pusher structure B can be greatly reduced also when the workpieces have been moved onto their respective platens 1 and are approaching their positions corresponding to the end point of the movement of the pusher structure B, the adverse effects due to impact is prevented at this part of the movement.

As described above, the present invention provides a mechanism whereby the speed of movement of the pusher structure B can be reduced to an extremely low value at the start and end of the movement, independently of the intermediate speed. Therefore, the mean reciprocation speed of the pusher structure B can be remarkably increased thereby to effect operational speed up. Furthermore, the loss in time for chaniging the direction of travel of the pusher structure is completely eliminated, whereby the operation speed is further increased.

A further advantage of the present invention resides in the possibility of its application to a highly efficient device for ejecting workpieces by a simple alteration of the construction of the mechanism as described above, as will be obvious to those skilled in the art.

It should be understood, of course, that the foregoing disclosures relates to only a preferred embodiment of the invention and that it is intended to cover all changes and modifications of the example of the invention herein chosen for the purposes of the disclosure, which do not constitute departures from the spirit and scope of the invention as set forth in the appended claim.

What I claim is:

In a board material insertion and ejection apparatus of a multi-platen hot press, a mechanism for shifting board material sheets comprising at least one pair of sprocket wheels, driving means for driving one of said pair, a sprocket chain trained about said sprocket wheels, guide means, a pusher structure free to move along said guide means, said pusher structure moveable along said guide means in a direction to shift said board material sheets relative to said press, a link member connecting said sprocket chain to said pusher structure for imparting reciprocating movement to said pusher structure when said chain is driven, an arm pivotally connected to said pusher structure, said arm having an elongated slot therein, and a pin in said link positioned in said slot for sliding movement, whereby said arm during reciprocating movement of said pusher structure co-acts with said link member and pusher structure to maintain said chain in a substantially straight line between tangent points of said sprocket.

References Cited

UNITED STATES PATENTS

| 1,795,352 | 3/1931 | Sundbom | 198—24 |
| 2,718,972 | 9/1955 | Temple | 214—16.4 |

FOREIGN PATENTS

| 763,375 | 12/1956 | Great Britain. |
| 815,442 | 6/1959 | Great Britain. |

GERALD M. FORLENZA, *Primary Examiner.*

HUGO O. SCHULZ, *Examiner.*

R. B. JOHNSON, *Assistant Examiner.*